July 1, 1958
O. GREBE ET AL
2,841,753
MOTOR REGULATING APPARATUS
Filed Jan. 24, 1955
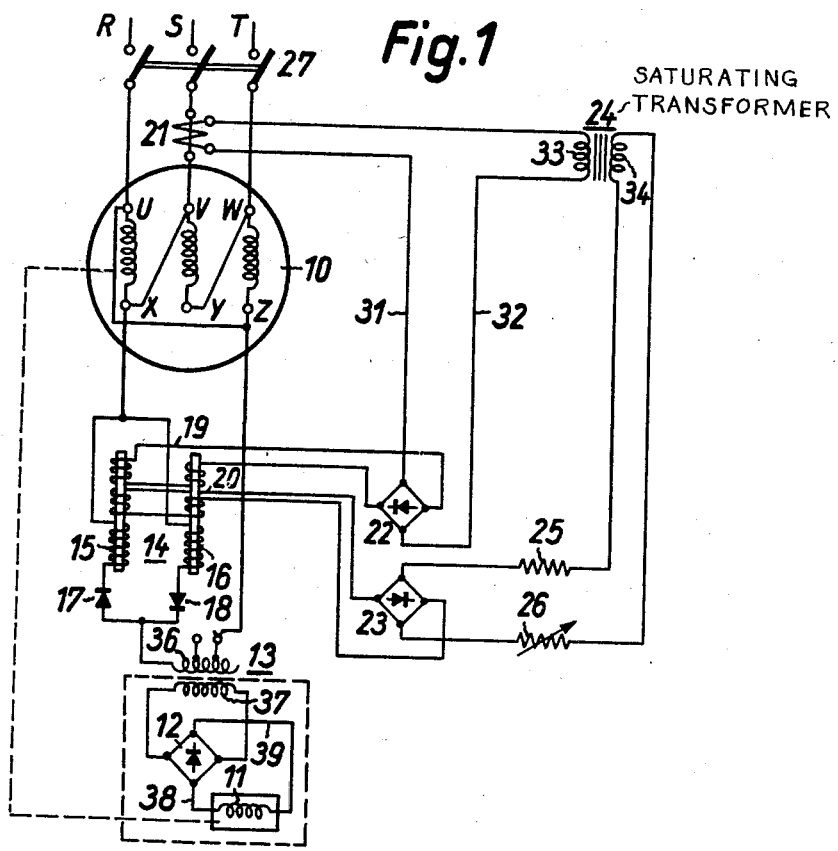
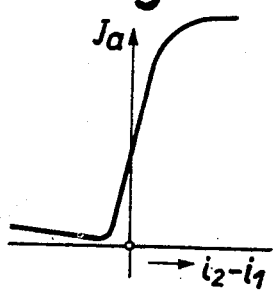
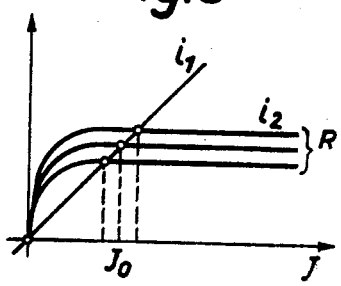
Inventors:
OTTO GREBE AND
ALFRED LANG
BY:

United States Patent Office 2,841,753
Patented July 1, 1958

2,841,753

MOTOR REGULATING APPARATUS

Otto Grebe, Olpe, Westphalia, and Alfred Lang, Esslingen, Germany, assignors to Elektro-Mechanik G. m. b. H., Olpe, Westphalia, Germany Application January 24, 1955, Serial No. 483,704

Claims priority, application Germany January 23, 1954

1 Claim. (Cl. 318—433)

The present invention relates to motor regulating apparatus, and more particularly to an apparatus for regulating the energizing current of a motor that is used to drive machines having high moments of inertia.

When motors are used to drive machines having a high moment of inertia, it is necessary to provide some means for limiting the starting current of the motor. That is, when the motor must start the heavy machine, in order to provide sufficient starting torque, the energizing starting current tends to get abnormally high and can easily affect the motor adversely.

It is known in the art to provide a magnetic coupling or clutch between the driving motor and the driven machine. The magnetic coupling transmits a substantially constant torque and permits the driven machine to be accelerated from a dead stop to its full running speed with a constant acceleration.

After the driving motor and the driven machine have been rotating for a comparatively long time the magnetic power or fluid used in the magnetic clutch sometimes varies, thereby varying the frictional force transmitted by the magnetic clutch. It is apparent that if there is a difference in speed between the driving motor and the driven machine, the energy difference is dissipated in heat due to frictional forces.

There are other reasons why the coupling force between the driving motor and the driven machine is varied. These usually are concerned with variations in the voltage supply which provides energizing current for the motor or else the variations are due to temperature changes in the rotating parts. It is therefore necessary to regulate the energizing current for the motor which, in turn, regulates the coupling force of the magnetic clutch.

Accordingly, it is an object of the present invention to provide a new and improved method and apparatus for regulating the energizing current of a motor.

Another object of the present invention is to provide a new and improved method and apparatus for regulating the energizing current of a motor that is coupled to a magnetic clutch.

A further object of the present invention is to provide a new and improved apparatus for regulating the energizing current of a motor along a predetermined characteristic curve.

Still a further object of the present invention is to provide a new and improved apparatus for providing a constantly accelerating starting current for a motor.

With the above objects in view the present invention mainly consists of an apparatus for regulating the energizing current of an electromagnetic clutch of a motor depending upon the motor current compared with a desired value, and including a magnetic amplifier having at least one main winding and supplying the current to the clutch, the main winding being connected in parallel with the energizing circuit of the motor and having means responsive to the energizing current of the motor for varying the impedance of the main winding of the amplifier so as to keep the energizing current of the motor at a predetermined value by influencing the torque transmitted by the clutch.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 is a schematic wiring diagram of a preferred embodiment of the present invention;

Fig. 2 is a graphical representation of the operating characteristic of the magnetic amplifier used in Fig. 1; and Fig. 3 is a graphical representation of the variations of the various currents in the circuit of Fig. 1.

Referring now to Fig. 1, the numeral 10 represents the driving motor which can have three-phase stator windings shown as UX, VY and WZ respectively, and a squirrel-cage rotor. One side of the stator windings are connected respectively to one phase of the three-phase voltage supply R, S and T through a three-pole switch 27.

Shown in parallel with the motor winding UX are the main windings 15 and 16 of a magnetic amplifier 14. In series with the winding 15 is connected a half-wave rectifier 17 and in series with the winding 16 is connected a half-wave rectifier 18 of opposite polarity to the recifier 17. The magnetic amplifier 14 also has two control windings 19 and 20.

The control winding 19 is connected across the output of a full-wave bridge rectifier 22 the input terminals of which are connected by conductors 31 and 32 to a current transformer 21 and the primary winding 33 of a saturable transformer 24. The transformer 24 has a secondary winding 34 which has one end connected through a resistor 25 to one input terminal of a full-wave bridge rectifier 23. The other end of winding 34 is connected through an adjustable resistor 26 to the other input terminal of the rectifier 23. The output terminals of the rectifier 23 are connected to the control winding 20.

Connected in series with the main windings of the magnetic amplifier 14 is the primary winding 36 of a transformer 13. It can be seen that the primary winding 36 has a plurality of taps connected to different portions thereof. The transformer 13 has a secondary winding 37 connected to the input terminals of a bridge rectifier 12, the output terminals of which are connected by conductors 38 and 39 to the exciting winding 11 of the magnetic clutch to which the motor 10 is connected.

The magnetic amplifier 14 and the rectifiers 22 and 23 are arranged so that the current flowing in the control winding 19 is in an opposite direction to the direction of the current flowing in the control winding 20. Referring now to Fig. 2 the operating characteristics of the magnetic amplifier are shown. When the current $i_1$ in the control winding 19 is equal to the current $i_2$ in the control winding 20, the impedances of the main windings 15 and 16 are so arranged to have a value between the minimum and maximum impedance.

From the graph it is seen that as the difference $i_2-i_1$ becomes larger the amount of current $J_a$ flowing from the main windings of the magnetic amplifier to the transformer 13 increases and conversely as the difference $i_2-i_1$ decreases the amount of current flowing through the amplifier decreases. This means, if $i_2$ is constant, an increase of $i_1$ causes the current $J_a$ to decrease, while if $i_1$ decreases $J_a$ increases.

Accordingly, in operation, if the starting current of the motor falls below the desired predetermined value on the acceleration curve the current induced in the current transformer 21 will be less than desired and accordingly the current $i_1$ flowing in the control winding 19 will be less than its predetermined value.

However, the current $i_2$ flowing in the control winding 20 will remain substantially constant at a value predetermined by setting the resistor 26. This is due to the properties of the saturable transformer 24 which maintains a substantially constant induced secondary voltage regardless of any changes in the applied primary voltage. Accordingly, the current difference, $i_2-i_1$ will be more than the predetermined desired difference. This will cause the main windings 15 and 16 to have a lower impedance and, as shown in Fig. 2, results in a larger current $J_a$ flowing from the windings 15, 16 to the transformer 13.

This larger current is transformed in the transformer 13 and applied to the exciting winding 11 of the magnetic clutch to increase the coupling forces thereof so that a greater torque is transmitted from the motor 10 which means that the motor carrying a greater load draws more current and that the acceleration curve will be substantially linear at all times.

On the other hand, if the energizing current of the motor increases above the desired value, it will be necessary for the regulating device of the present invention to decrease this current. It is apparent that, in the manner described hereinabove, the current $i_1$ will be increased and the current $i_2$ will remain substantially constant. Therefore, the current difference $i_2-i_1$ will decrease, causing an increase in the impedance of the magnetic amplifier and a consequent decrease in the energizing current.

It is apparent that the decrease or increase of the energizing current from the predetermined desired values may be caused by some change in the characteristics of the magnetic powder or fluid used in the magnetic clutches. These changes may also be caused by fluctuations in the power supply.

The saturable transformer can be arranged by conventional means to provide a substantially constant secondary voltage while the voltage applied to the primary thereof changes in the ratio of 100 to 1.

Referring now to Fig. 3, the characteristic curves of the currents in the regulating circuit of Fig. 1 are shown. The current $i_1$ in the control winding 19 of the magnetic amplifier 14 increases linearly with increase of the energizing current J of the motor. However, the control current $i_2$ in the control winding 20 remains substantially constant with change in the energizing current J in the zone of the desired current value $J_0$. Therefore, the current difference $i_2-i_1$ may be either positive or negative depending on the direction of the variation of the energizing current J from the desired value $J_0$.

By adjusting the value of the adjustable resistor 26 of Fig. 1, it is possible to raise or lower the constant level of the current $i_2$ flowing in the control winding 20.

Similarly, the taps of the primary winding 36 of the transformer 13 may be adjusted to choose the desired range of current for energizing the exciting winding 11 of the magnetic clutch.

It will be understood that each of the elements described above, or two or more together, may also find a useful application in other types of regulating apparatus differing from the types described above.

While the invention has been illustrated and described as embodied in regulating apparatus for motors coupled to magnetic clutches, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In an apparatus for maintaining constant the energizing current and the delivered torque of a motor during start under load, the motor having at least one field winding and being coupled to a magnetic fluid clutch having an exciting winding, in combination, a magnetic amplifier having at least one main winding and a first and a second control winding, said main winding being connected in parallel with said field winding; means for transmitting the output of said magnetic amplifier to said exciting winding of said clutch; a current transformer in circuit with said first control winding and with the energizing current of said motor, and producing a current proportional to said energizing current for providing in said first control winding a current proportional to said energizing current; and a source of substantially constant potential connected to said second control winding for providing a substantially constant current in said second control winding, whereby the difference between the currents flowing in said first and second control windings varies the impedance of said main winding of said magnetic amplifier and thereby controls the exciting current of said magnetic fluid clutch so as to maintain constant the energizing current of the motor by maintaining constant the torque transmitted by said clutch.

References Cited in the file of this patent

UNITED STATES PATENTS

| | | |
|---|---|---|
| 2,286,778 | Winther | June 16, 1942 |
| 2,697,794 | Jaeschke | Dec. 21, 1954 |
| 2,707,260 | Rhyne | Apr. 26, 1955 |
| 2,721,305 | Steinitz | Oct. 18, 1955 |